US011961687B2

(12) United States Patent
Kaneko et al.

(10) Patent No.: US 11,961,687 B2
(45) Date of Patent: Apr. 16, 2024

(54) PUSH SWITCH

(71) Applicant: ALPS ALPINE CO., LTD., Tokyo (JP)

(72) Inventors: Akira Kaneko, Miyagi (JP); Katsutoshi Usui, Miyagi (JP); Hiroshi Ohara, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 17/234,915

(22) Filed: Apr. 20, 2021

(65) Prior Publication Data

US 2021/0335558 A1 Oct. 28, 2021

(30) Foreign Application Priority Data

Apr. 28, 2020 (JP) ................................ 2020-079268

(51) Int. Cl.
*H01H 13/14* (2006.01)
*H01H 13/04* (2006.01)

(52) U.S. Cl.
CPC ............ *H01H 13/14* (2013.01); *H01H 13/04* (2013.01)

(58) Field of Classification Search
CPC ........ H01H 13/26; H01H 13/36; H01H 13/46; H01H 13/48; H01H 13/14; H01H 13/04
See application file for complete search history.

(56) References Cited

U.S. PATENT DOCUMENTS 4,194,105 A * 3/1980 Hodges .............. H01H 13/7006 200/83 B
4,677,268 A * 6/1987 Nemeth ............... H01H 13/702 200/513
7,012,208 B2 * 3/2006 Wang ..................... H01H 13/52 200/341
7,737,373 B2 * 6/2010 In ............................ G06F 3/023 200/1 B
10,930,448 B2 * 2/2021 Ito .......................... H01H 13/79
(Continued)

FOREIGN PATENT DOCUMENTS

JP 2002-260479 9/2002
JP 3102120 U 7/2004
JP 2015-084302 4/2015

OTHER PUBLICATIONS

Japanese Office Action for 2020-079268 dated Nov. 7, 2023.

*Primary Examiner* — Lheiren Mae A Caroc
(74) *Attorney, Agent, or Firm* — IPUSA, PLLC

(57) ABSTRACT

A push switch includes a case having a housing space with an upper opening, fixed contacts provided at a bottom of the housing space in the case, a movable contact member having a dome-shaped member, the movable contact member being disposed in the housing space, and having a central portion that is brought into contact with the fixed contacts by inverting the movable contact member in response to the movable contact member being pushed by an operator, and a pushing member is disposed above the movable contact member, and the pushing member is configured to push the movable contact portion directly or through other portions upon being pushed by the operator. The pushing member pushes a portion being situated outside of a central portion of the movable contact member directly or through other portions.

3 Claims, 17 Drawing Sheets

(56) References Cited

U.S. PATENT DOCUMENTS

| | | | | |
|---|---|---|---|---|
| 2005/0224321 | A1* | 10/2005 | Yamasaki | H01H 25/041 200/6 A |
| 2006/0037851 | A1* | 2/2006 | Hu | H01H 13/48 200/406 |

* cited by examiner

PUSH SWITCH

CROSS-REFERENCE TO RELATED APPLICATION

The present application is based on and claims priority to Japanese patent application No. 2020-079268 filed on Apr. 28, 2020, with the Japanese Patent Office, the entire contents of which are hereby incorporated by reference.

BACKGROUND OF THE INVENTION

1. Field of the Invention

The disclosures herein relate to a push switch.

2. Description of the Related Art

Patent Document 1 discloses an illuminated switch including a dome-shaped movable contact made of metal and a light source for illumination, wherein a hole is provided at the top of the movable contact, and a through-hole is provided on the printed circuit board at a position opposite the hole, wherein a first fixed contact is located on the outer periphery of the through-hole, and wherein a light source is exposed from the through-hole, so that the light source illuminates toward the hole of the movable contact.

Conventionally, a technique has been devised in which the top (center) of the metal contact is pushed against a pushing portion in a switching device configured so that the metal contact contacts the fixed contact by inverting the metal contact. However, such related art techniques have required reducing the size of the metal contact in order to shorten the stroke amount of the pushing operation. Simply reducing the size of the metal contact may reduce the withstand voltage and cause dielectric breakdown because the metal contact and the fixed contact during the non-pushing operation are close to each other.

Patent Document 1: Japanese Patent Application Laid-Open No. 2002-260479

SUMMARY OF THE INVENTION

A push switch includes a case having a housing space with an upper opening, fixed contacts provided at a bottom of the housing space in the case, a movable contact member having a dome-shaped member disposed in the housing space, and having a central portion to be brought into contact with the fixed contacts by inverting the movable contact member when the movable contact member is subjected to pushing pressure from an operator. A pushing member is disposed above the movable contact member. The pushing member is configured to push the movable contact portion directly or through other portions upon being pushed by the operator. The pushing member pushes a portion being situated outside of a central portion of the movable contact member directly or through other portions.

According to one embodiment, the stroke amount of a pushing operation can be reduced without reducing the size of the metal contacts.

DESCRIPTION OF THE PREFERRED EMBODIMENTS

Figure 1:
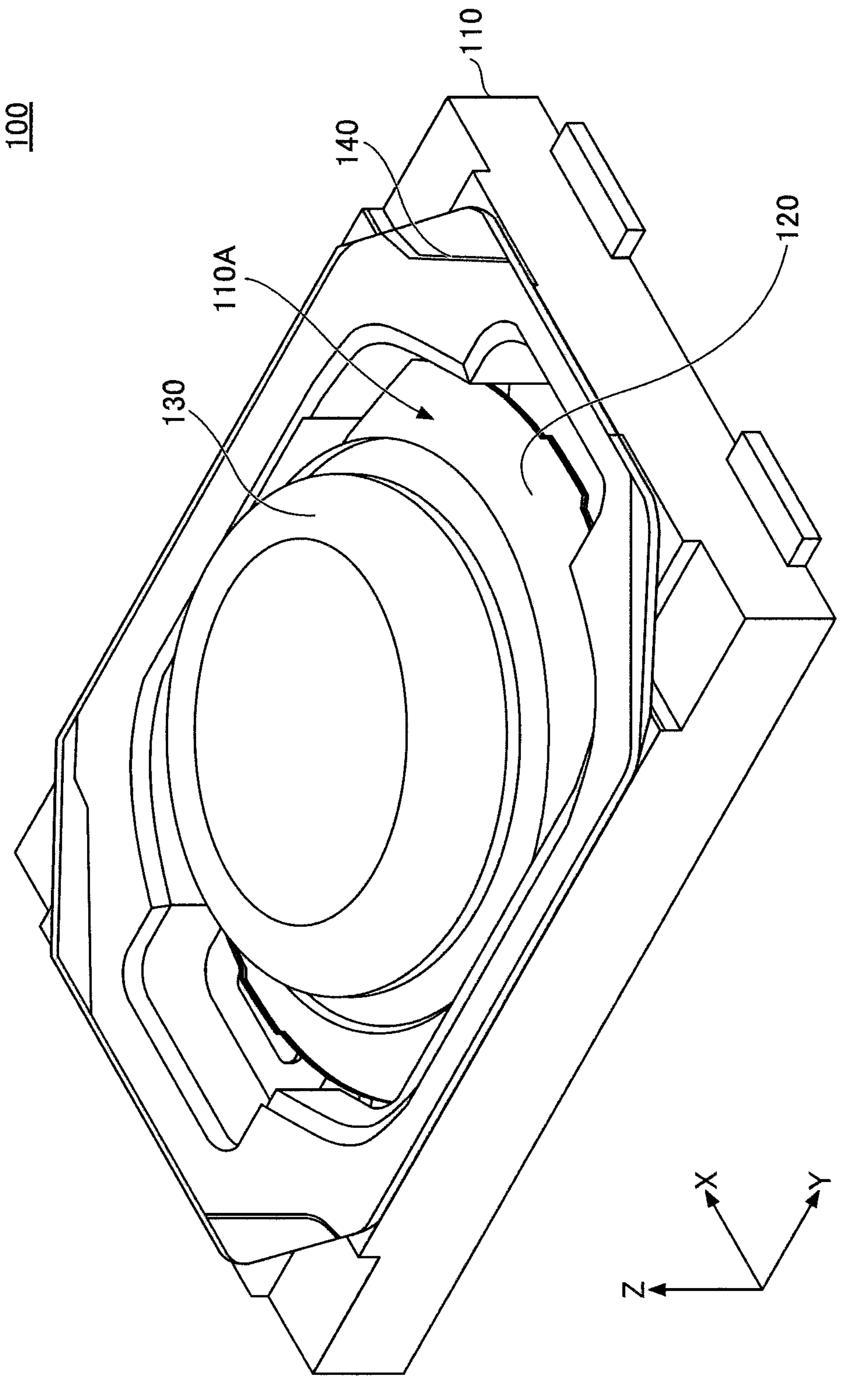
FIG. 1 is a perspective view of a push switch according to one embodiment.

Hereinafter, an embodiment will be described with reference to the drawings. In the following description, for convenience, the Z-axis direction in the drawings illustrates a height direction. The Y-axis direction in the drawings illustrates a lengthwise direction. The X-axis direction in the drawings illustrates a widthwise direction.

[Outline of Push Switch 100]

FIG. 1 is a perspective view of a push switch 100 according to one embodiment. As illustrated in FIG. 1, the push switch 100 generally has a thin rectangular shape in the height direction (in the Z-axis direction). As illustrated in FIG. 1, the push switch 100 contains metal contacts 120 in a housing space 110A of a case 110. An upper opening of the housing space 110A in the case 110 is covered with a cover sheet 140. An upward (in the Z-axis positive direction) convex pushing member 130 is provided on a center portion of the back side of the cover sheet 140.

The push switch 100 can be switched between the on-state and the off-state by pushing the pushing member 130 downward (in the negative Z-axis direction). Specifically, in the push switch 100, when the pushing member 130 is not pushed downward, first fixed contacts 111 (see FIG. 2) and a second fixed contacts 112 (see FIG. 2) provided in the housing space 110A in the case 110 are in a non-conductive state. Therefore, the push switch 100 is in an off-state.

In the push switch 100, when the pushing member 130 is pushed downward, the metal contacts 120 become inverted due to elastic deformation by the downward pushing of the pushing member 130, and the first and second fixed contacts 111 and 112 become connected through the metal contacts 120. As a result, the push switch 100 switches to the on-state. When the push switch 100 is released from the pushing operation of a pushing member 130, an elastic reverting force of the metal contacts 120 restores the original state of the metal contacts. This causes the push switch 100 to return to the off-state.

[Configuration of Push Switch 100]

Figure 2:
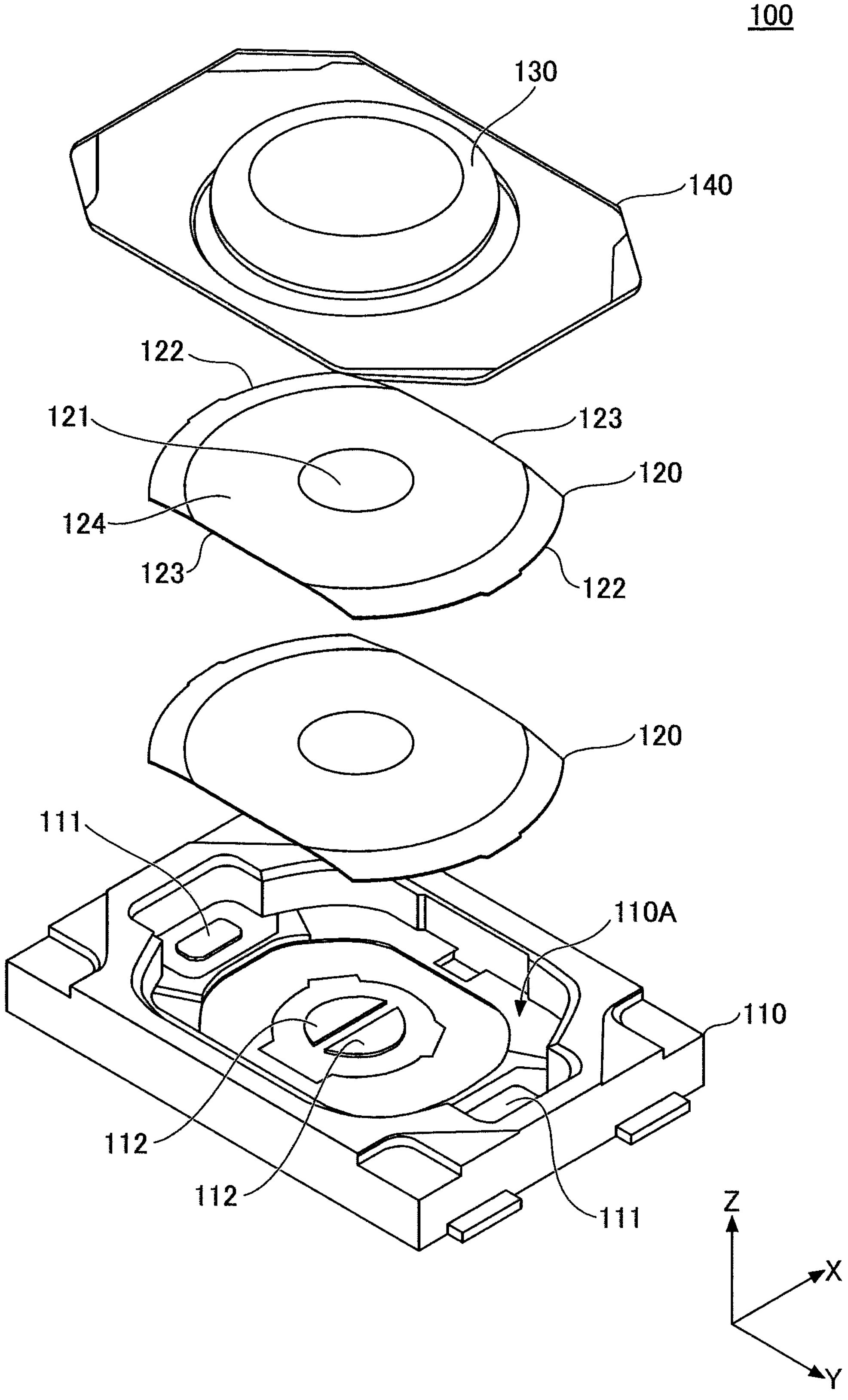
FIG. 2 is an exploded perspective view of the push switch according to the embodiment.

FIG. 2 is an exploded perspective view of the push switch 100 according to the embodiment. As illustrated in FIG. 2, the push switch 100 is configured with a case 110, two metal contacts 120, a pushing member 130, and a cover sheet 140, starting from the bottom side (in the Z-axis negative direction) in the drawings.

The case 110 is a container-like member having a thin rectangular shape in the height direction (in the Z-axis direction). The case 110 has a rectangular shape in which the lengthwise direction (in the Y-axis direction) is in the longitudinal direction and the widthwise direction (in the X-axis direction) is in the shorter direction in the plan view. The case 110 has a housing space 110A with an upper opening. The housing space 110A has a longitudinal shape in which the lengthwise direction (the Y-axis direction) is in the longitudinal direction and the widthwise direction (the X-axis direction) is in the shorter direction in a plan view. The metal contacts 120 are housed within the housing space 110A. The shape of the housing space 110A is substantially the same shape as the shape of the metal contacts 120. For example, the case 110 may be formed by insert molding using relatively rigid insulating materials (for example, a rigid resin, and the like).

At the bottom of the housing space 110A in the case 110, two first fixed contacts 111 and two second fixed contacts 112 are provided.

The two first fixed contacts 111 are provided at each end in the lengthwise direction (in the Y-axis direction) at the bottom of the housing space 110A. Each of the two first fixed contacts 111 is in contact with a peripheral portion of the metal contacts 120 (curved edges 122, described below) and electrically connected to the metal contacts 120 by placing the metal contacts 120 in the housing space 110A. The two second fixed contacts 112 are located towards the center of the bottom of the housing space 110A. The two second fixed contacts 112 are electrically connected to the metal contacts 120 by contacting the back surface of the central portion of the metal contacts 120 when the central portion of the metal contacts 120 deforms in a concave manner. Thus, the two second fixed contacts 112 conduct through the metal contacts 120 to each of the two first fixed contacts 111. For example, the first fixed contact 111 and the second fixed contact 112 may be formed by processing a metal plate and are subsequently embedded in the case 110 by insert molding.

The metal contacts 120 are an example of a "movable contact member". The metal contacts 120 are a dome-shaped member formed of a thin metal plate with an upward (in the Z-axis positive direction) convex shape. The metal contacts 120 are contained within a housing space 110A in the case 110. The metal contact 120 is a dome-shaped member with a central portion 121, which is a circular view when viewed from the top. The metal contact 120 also has an annular sloped portion 124 around the central portion 121.

The outer shape of the metal contacts 120 has a pair of curved edges 122 in the lengthwise directions (in the Y-axis direction) and a pair of linear edges 123 in the widthwise direction (in the X-axis direction) in a plan view. The curved edges 122 are portions extending curvilinearly along the circumferential portion having a predetermined radius. The linear edges 123 are portions extending linearly along the widthwise direction (Y-axis direction). The metal contacts 120 are formed by cutting side portions from a circular member in a plan view such that both edges of the member in the widthwise direction (X-axis direction) are linear along the lengthwise direction (Y-axis direction). As a result, the metal contacts. 120 are formed into an external shape having a pair of curved edges 122 and a pair of linear edges 123. That is, the metal contacts 120 have a longitudinal shape in which the lengthwise direction (the Y-axis direction) is in the longitudinal direction and the widthwise direction (the X-axis direction) is in the short direction.

The metal contacts 120 are housed within the housing space 110A in the case 110 to contact each of the two first fixed contacts 111 placed at the bottom of the housing space 110A and electrically connect to each of the two first fixed contacts 111 in the curved edges 122. The metal contacts 120 are pushed downward by the pushing member 130 when the pushing member 130 is pushed down, and once the load exceeds the predetermined operating load, the central portion 121 abruptly elastically deforms (inverting) into a concave shape. Thus, the metal contacts 120 are in contact with the second fixed contact 112 provided at the bottom of the housing space 110A at the back of the central portion 121 and are electrically connected to the second fixed contact 112. The metal contacts 120 return to their original convex shape by elastic force when released from the pushing force from the pushing member 130.

The pushing member 130 is an upward (in the Z-axis positive direction) convex portion disposed above the metal contacts 120. The pushing member 130 is formed of a resin material such as PET and the like. As illustrated in FIG. 2, in the present embodiment, the pushing member 130 has a disc-like shape. The pushing member 130 is bonded to the back surface and the central portion of the cover sheet 140 at its top surface by any suitable bonding method (for example, laser welding, and the like).

The cover sheet 140 is a thin sheet-like member disposed on the top surface of the case 110. The cover sheet 140 may be formed of a resin material such as PET and the like. The cover sheet 140 has a rectangular shape in which the lengthwise direction (in the Y-axis direction) is in the longitudinal direction and the widthwise direction (in the X-axis direction) is in the shorter direction in the plan view. That is, the cover sheet 140 has a shape substantially the same as the top surface of the case 110 in the plan view. The cover sheet 140 is bonded to the top surface of the case 110 by any bonding method (for example, laser welding, and the like) while covering the top surface of the case 110. The cover sheet 140 seals the housing space by sealing the upper opening of the housing space 110A in the case 110. The convex pushing member 130 is bonded upwardly (in the Z-axis positive direction) to the back and central portions of the cover sheet 140.

Figure 3:
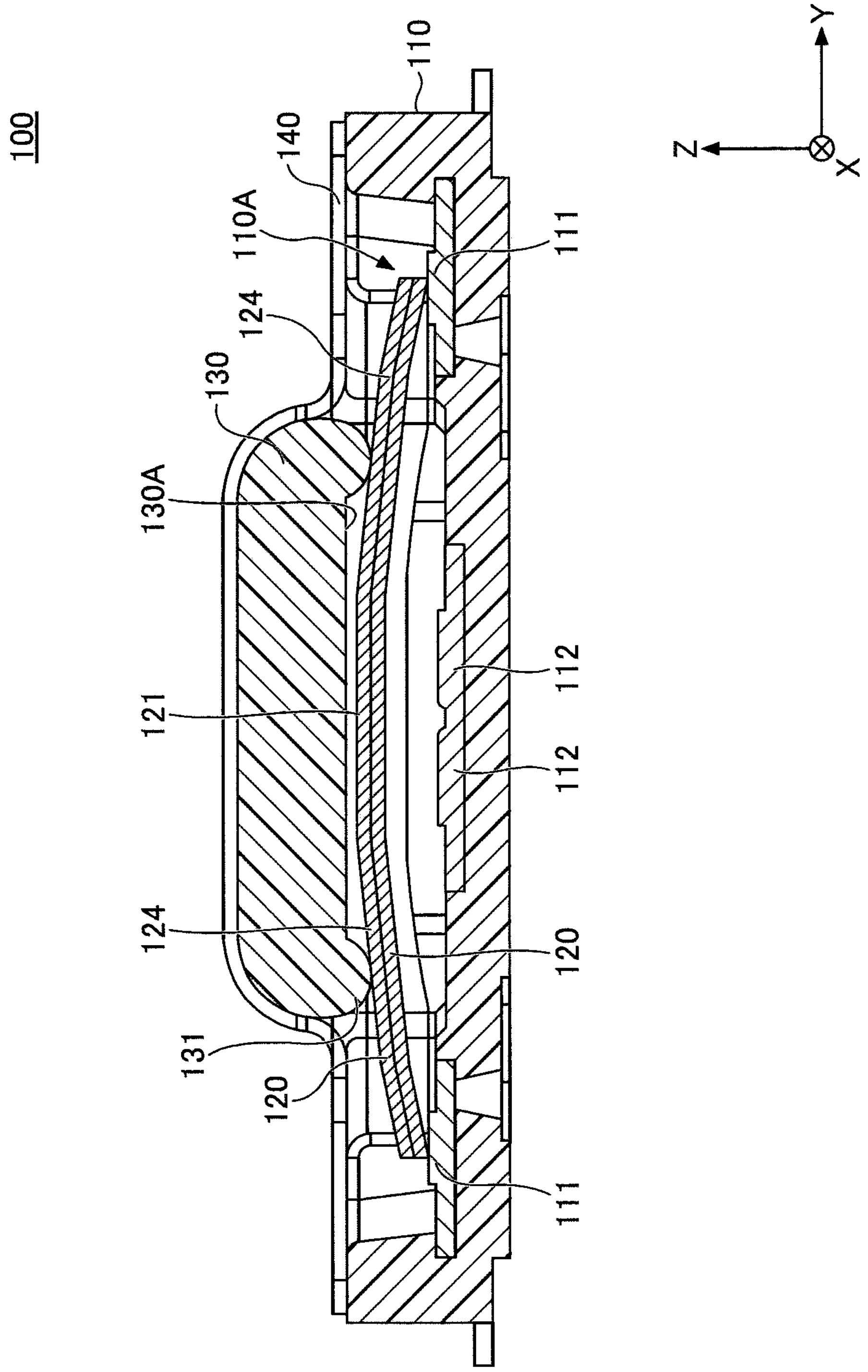
FIG. 3 is a cross-sectional view taken along a YZ plane of the push switch according to one embodiment.

FIG. 3 is a cross-sectional view taken along the YZ plane of the push switch 100 according to the embodiment. As illustrated in FIG. 3, the diameter of the pushing member 130 is greater than the diameter of the central portion 121 of the metal contacts 120 and smaller than the diameter of the sloped portion 124 of the metal contacts 120. Further, as illustrated in FIG. 3, an annular pushing portion 131 that protrudes downward (in the Z-axis negative direction) is provided at the outer peripheral edge of the circular-shaped bottom surface 130A of the pushing member 130. The pushing portion 131 abuts the sloped portion 124 of the metal contacts, the sloped portion 124 being situated outside to the central portion 121 of the metal contacts 120.

[Operation of Push Switch 100]

Figure 4:
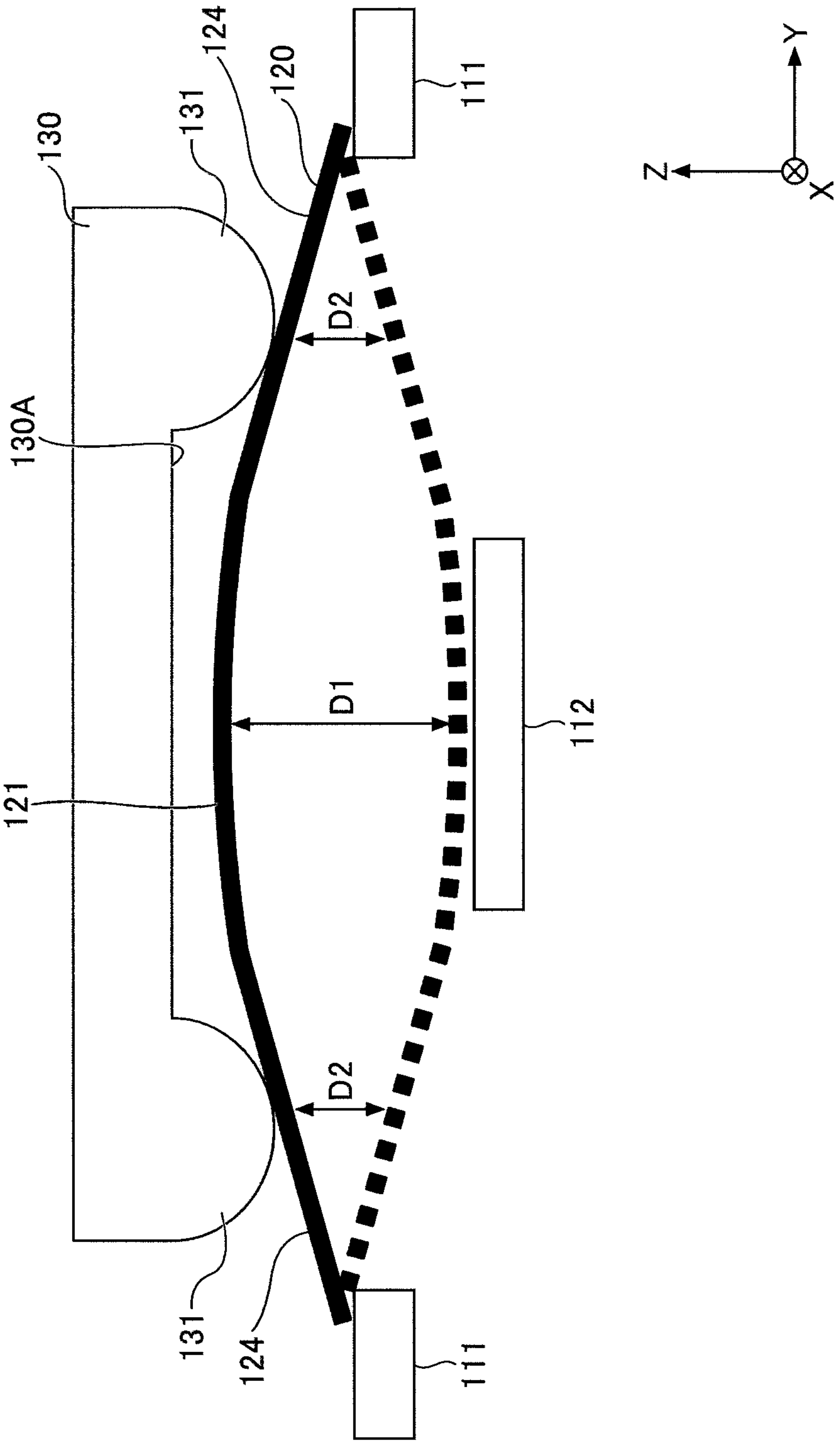
FIG. 4 is a schematic view of an operation of the push switch according to one embodiment.

FIG. 4 is a view illustrating an operation of the push switch 100 of one embodiment. As illustrated in FIG. 4, in the push switch 100 of one embodiment, when the pushing member 130 is pushed down by an operator, the annular pushing portion 131 pushes against the sloped portion 124 which is an outer portion of the central portion 121 of the metal contacts 120. This causes the metal contacts 120 to invert and deform the central portion 121 into a concave shape, as illustrated by a dotted line in FIG. 4. As a result, the metal contacts 120 are in contact with a second fixed contact 112 provided at the bottom of the housing space 110A and are electrically connected to the second fixed contact 112 at the back portion of the central portion 121. The metal contacts 120 returns to their original convex shape by elastic force when released from the pushing force from the pushing member 130. As illustrated in FIG. 4, the first fixed contacts 111 disposed at the bottom of the housing space 110A is constantly in contact with the outer peripheral portion of the metal contacts 120.

As illustrated in FIG. 4, the amount of movement D2 of the sloped portion 124 of the metal contacts 120 in the height direction (in the Z-axis direction) is smaller than the amount of movement D1 in the height direction (in the Z-axis direction) of the central portion 121 of the metal contacts 120. Accordingly, the push switch 100 of one embodiment employs a configuration in which the sloped portion 124 of the metal contact 120 is pushed by the annular pushing portion 131 of the pushing member 130, thereby reducing the stroke in the height direction (in the Z-axis direction) of the pushing member 130 as compared to a configuration in which the central portion 121 of the metal contacts 120 is pushed. That is, the push switch 100 of one embodiment can be switched to the on-state with a shorter operating stroke.

Comparative Examples

Figure 5:
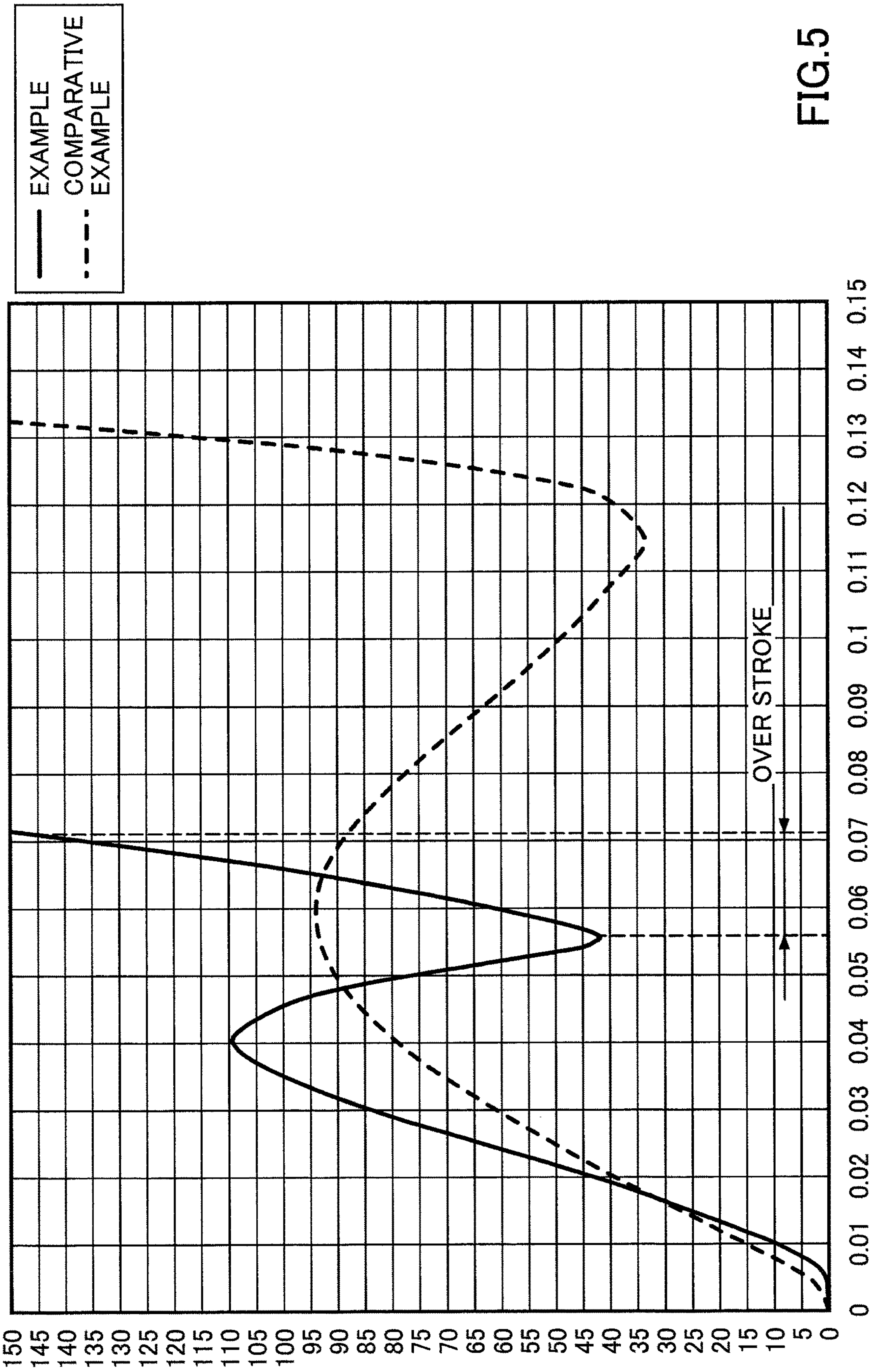
FIG. 5 is a diagram illustrating FS characteristics of the push switch according to one embodiment.

FIG. 5 is a diagram illustrating the FS characteristics of the push switch 100 of one embodiment. In the diagram illustrated in FIG. 5, the vertical axis represents the operating load and the horizontal axis represents the operating stroke. In the diagram illustrated in FIG. 5, the solid line indicates the FS characteristic of the push switch 100 of one embodiment, and the dashed line indicates the FS characteristic of the push switch according to the comparative example for comparison. The comparative example differs from the push switch of the embodiment in that a push switch 100 is modified in a configuration in which a central portion of metal contacts are pushed by a pushing member.

As illustrated in FIG. 5, the push switch in Comparative Example has a stroke amount of "0.06 mm" at the start of inverting the metal contacts and a stroke amount of "0.115 mm" at the end of inverting the metal contacts.

In contrast, the push switch 100 in the one embodiment has a stroke amount of "0.04 mm" at the start of inverting the metal contacts 120 and a stroke amount of "0.055 mm" at the end of inverting the metal contacts 120.

Thus, the push switch 100 in the one embodiment pushes the sloped portion 124 of the metal contacts 120 by the annular pushing portion 131 of the pushing member 130. This allows the push switch 100 in the one embodiment to invert the metal contacts 120 to switch the push switch 100 to the on-state with a shorter stroke amount than that of the push switch in the Comparative Example. Thus, according to the push switch 100 of the one embodiment, the stroke amount of the pushing operation can be reduced without reducing the size of the metal contacts 120.

Figure 6:
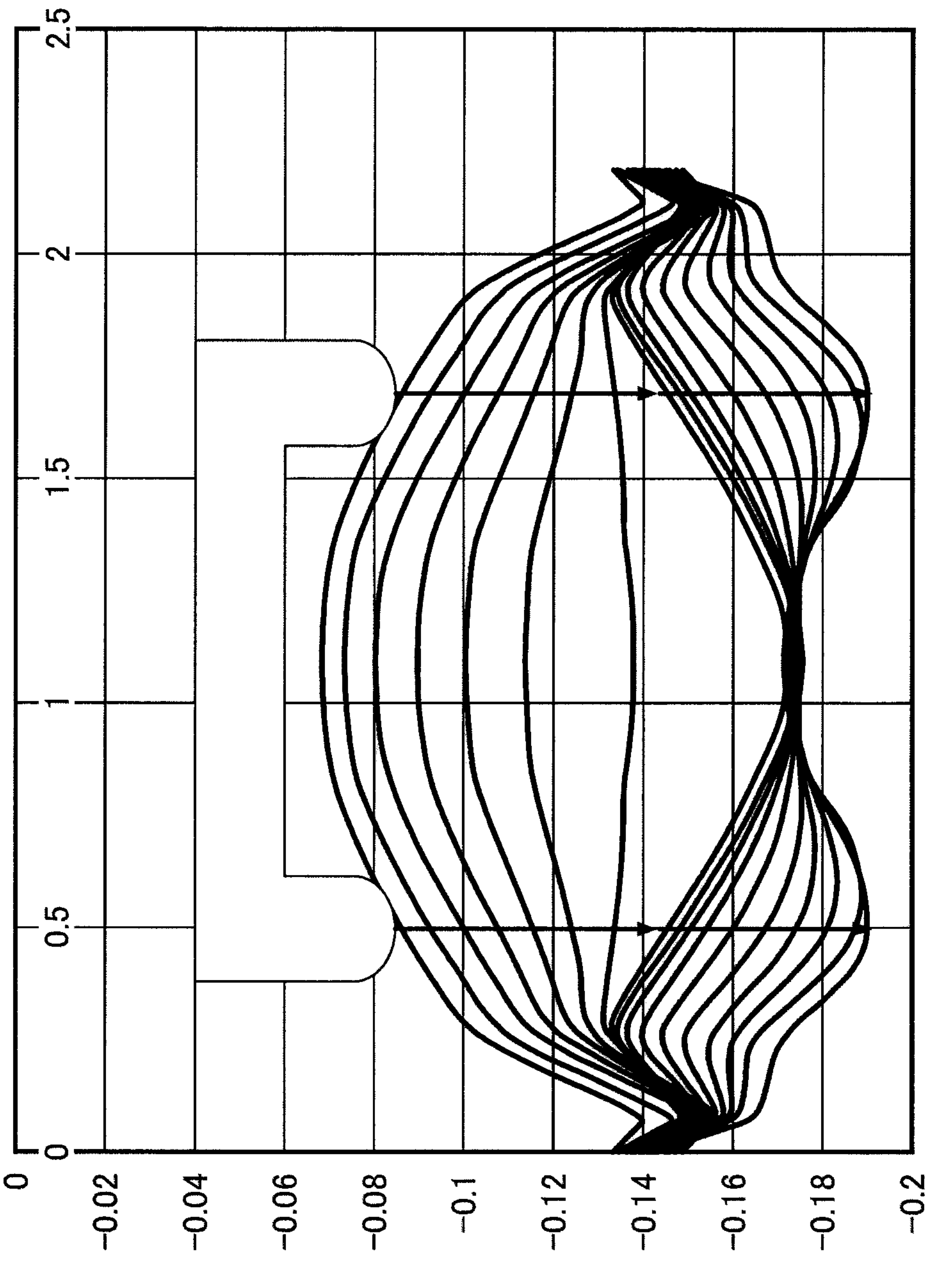
FIG. 6 is a view illustrating an amount of movement of metal contacts provided by the push switch according to one embodiment.

FIG. 6 is a diagram illustrating the amount of movement of the metal contacts 120 provided by the push switch 100 in the one embodiment. The push switch 100 of one embodiment pushes a portion more outwardly than the second fixed contact 112 in the metal contacts 120 by the annular pushing portion 131 of the pushing member 130. Accordingly, the push switch 100 of one embodiment can be elastically deformed downward at the outer portion of the second fixed contact 112 in the metal contacts 120 when the pushing member 130 is pushed further downward from a state in which the metal contacts 120 are inverted, as illustrated in FIG. 6, so that the pushing member 130 can be moved further downward. That is, the push switch 100 of one embodiment can over stroke the pushing member 130.

The push switch 100 of one embodiment can further reduce the stroke amount of the pushing operation by providing the pushing portion 131 further outward. However, the operating load increases as the position to push by the pushing portion 131 moves outward. Thus, the push switch 100 of one embodiment can be set to an appropriate push position by the pushing portion 131 in view of the stroke amount and the operating load of the pushing operation.

[First Modification]

Figure 7:
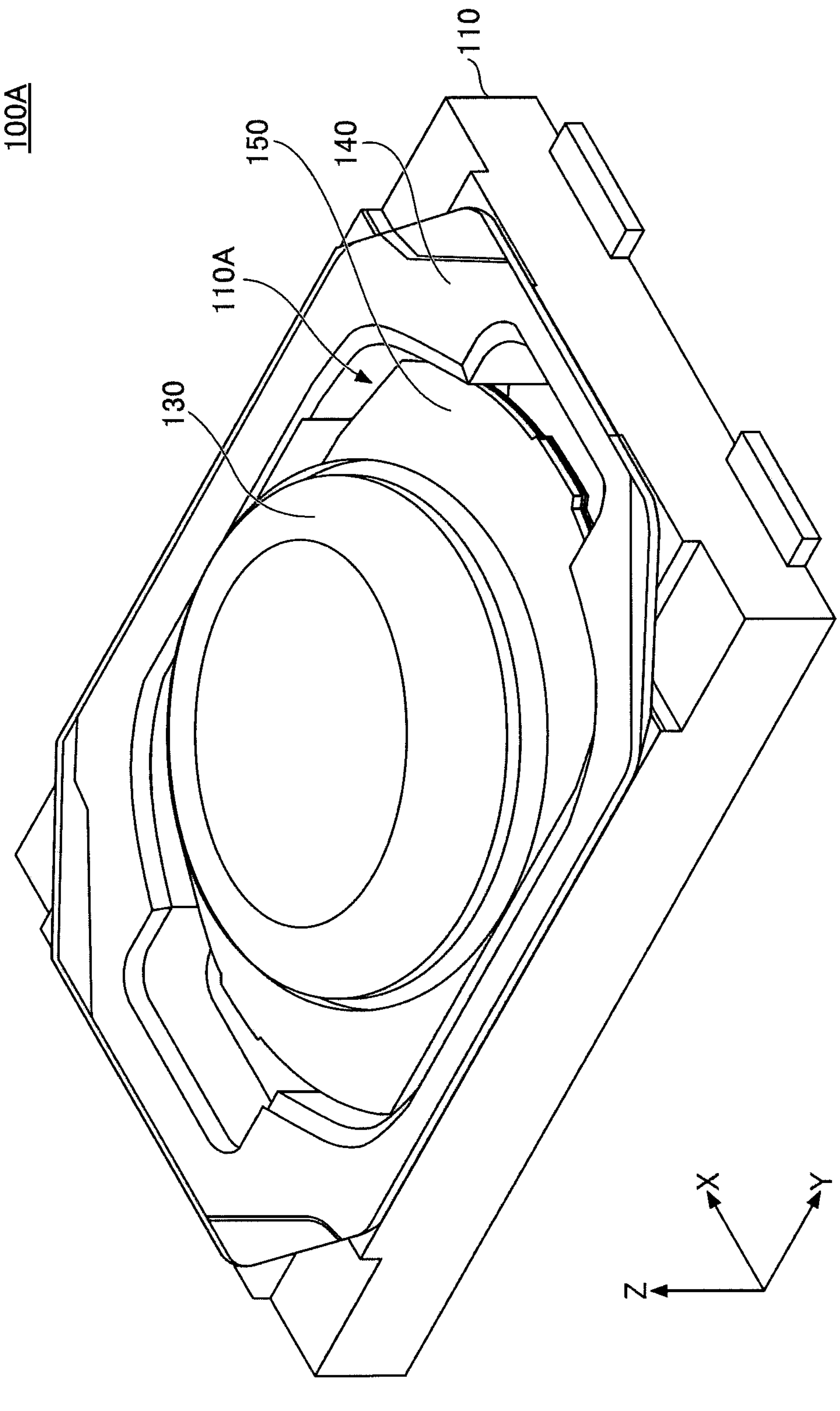
FIG. 7 is a perspective view of the push switch according to a first modification of the embodiment.
Figure 8:
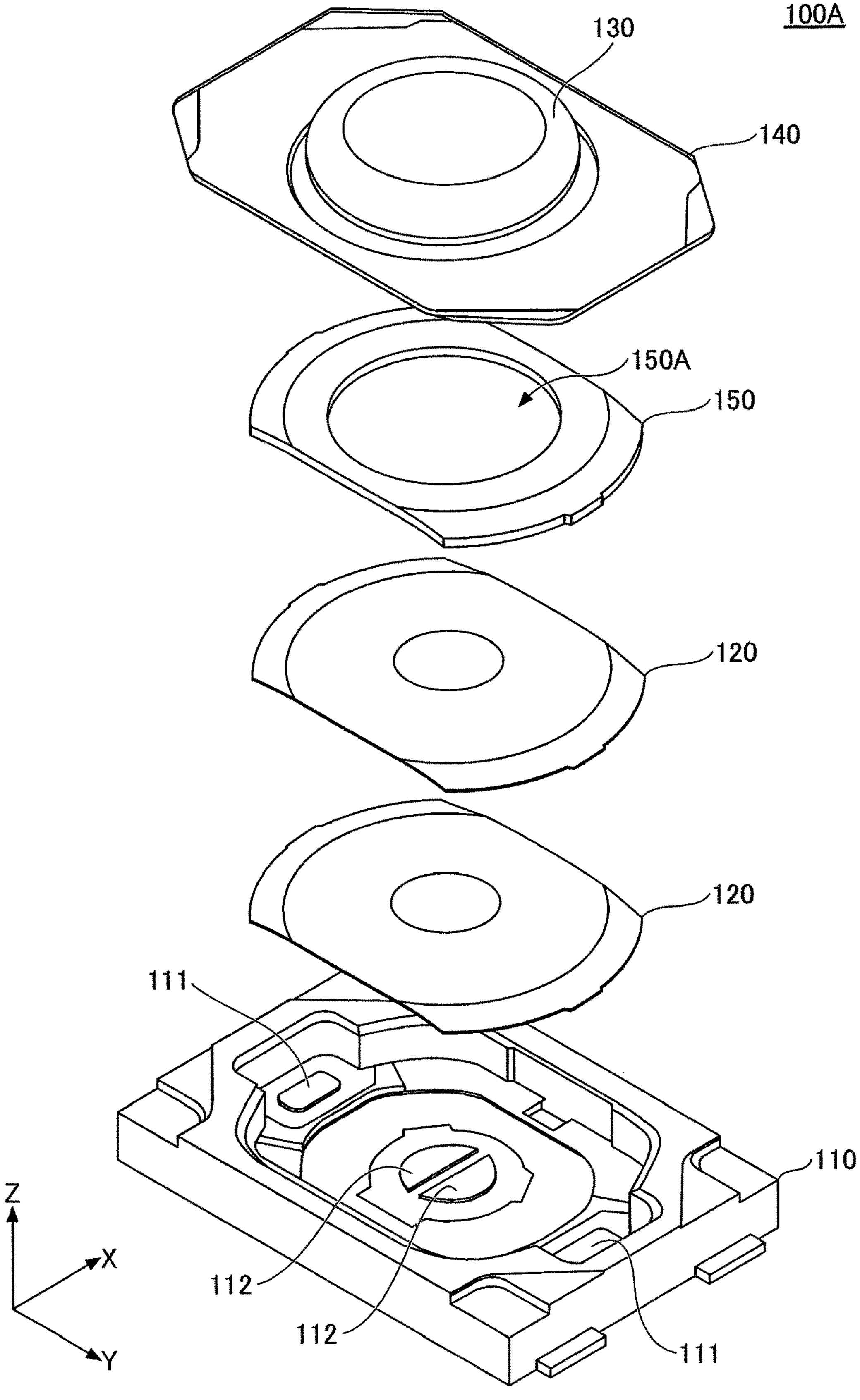
FIG. 8 is an exploded perspective view of the push switch according to the first modification.
Figure 9:
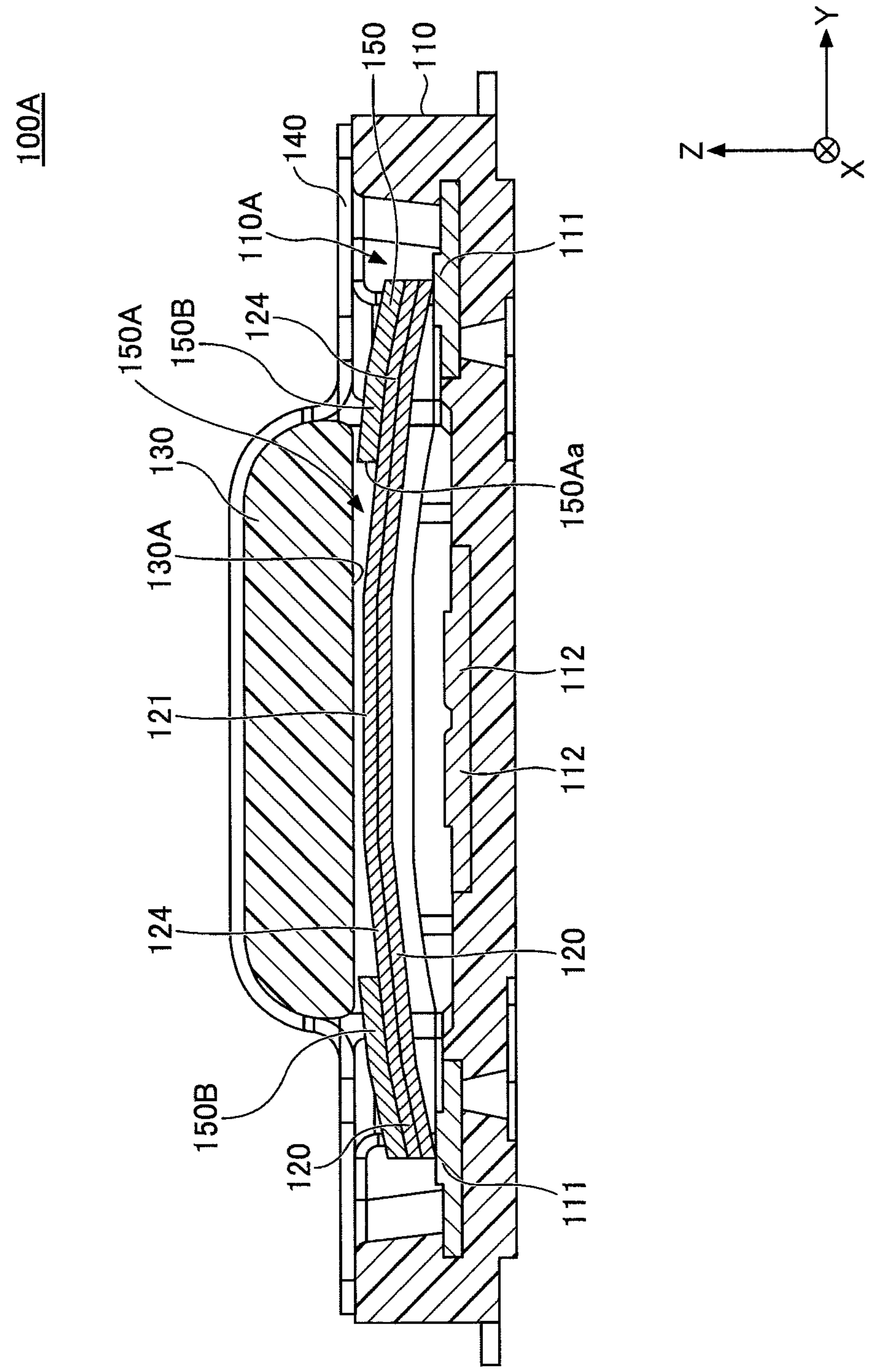
FIG. 9 is a cross-sectional view of the push switch taken along the YZ plane according to the first modification.

FIG. 7 is a perspective view of a push switch 100A of a first modification. FIG. 8 is an exploded perspective view of the push switch 100A of the first modification. FIG. 9 is a cross-sectional view taken along the YZ plane of the push switch 100A of the first modification.

The push switch 100A of the first modification does not have a pushing portion 131 on a bottom surface 130A of a pushing member 130. That is, in the push switch 100A of the first modification, the bottom surface 130A of the pushing member 130 is a flat surface.

The push switch 100A of the first modification is provided with a spacer 150 between the pushing member 130 and metal contacts 120. The spacer 150 is a dome-shaped member formed from a thin metal plate with an upward (in the Z-axis positive direction) convex shape.

The outer shape of the spacer 150 is substantially same as the outer shape of the metal contacts 120. The spacer 150 is placed on top of the metal contacts 120. However, the thickness of the spacer 150 is greater than the thickness of the metal contacts 120. Thus, the spacer 150 has a higher rigidity than the metal contacts 120. In addition, the spacer 150 may be formed of a material that is different from the material of the metal contacts, and that has a higher rigidity than the material of the metal contacts 120.

A circular opening 150A is formed in the central portion of the spacer 150. The diameter of the opening 150A is greater than the diameter of a central portion 121 of the metal contacts 120. The lower portion of an inner peripheral portion 150Aa of the opening 150A contacts a sloped portion 124 of the metal contacts 120. The upper portion of the inner peripheral portion 150Aa of the opening 150A is in contact with the bottom surface 130A of the pushing member 130.

In the push switch 100A of the first modification, when the pushing member 130 is pushed down by an operator, the sloped portion 124 being situated outside to the central portion 121 of the metal contacts 120 is pushed through the annular inner peripheral portion 150Aa of the opening 150A formed in the spacer 150.

Accordingly, the push switch 100A of the first modification can be switched to the on-state by inverting the metal contacts 120 with a shorter stroke amount than that of the conventional push switch. Therefore, according to the push switch 100A of the first modification, the stroke amount of the pushing operation can be reduced without reducing the size of the metal contacts 120.

In particular, the push switch 100A of the first modification is less likely to cause displacement of the spacer 150 with respect to the metal contacts 120, so that a predetermined position of the sloped portion 124 of the metal contacts 120 can be more reliably pushed by the annular inner peripheral portion 150Aa of the opening 150A formed in the spacer 150.

[Second Modification]

Figure 10:
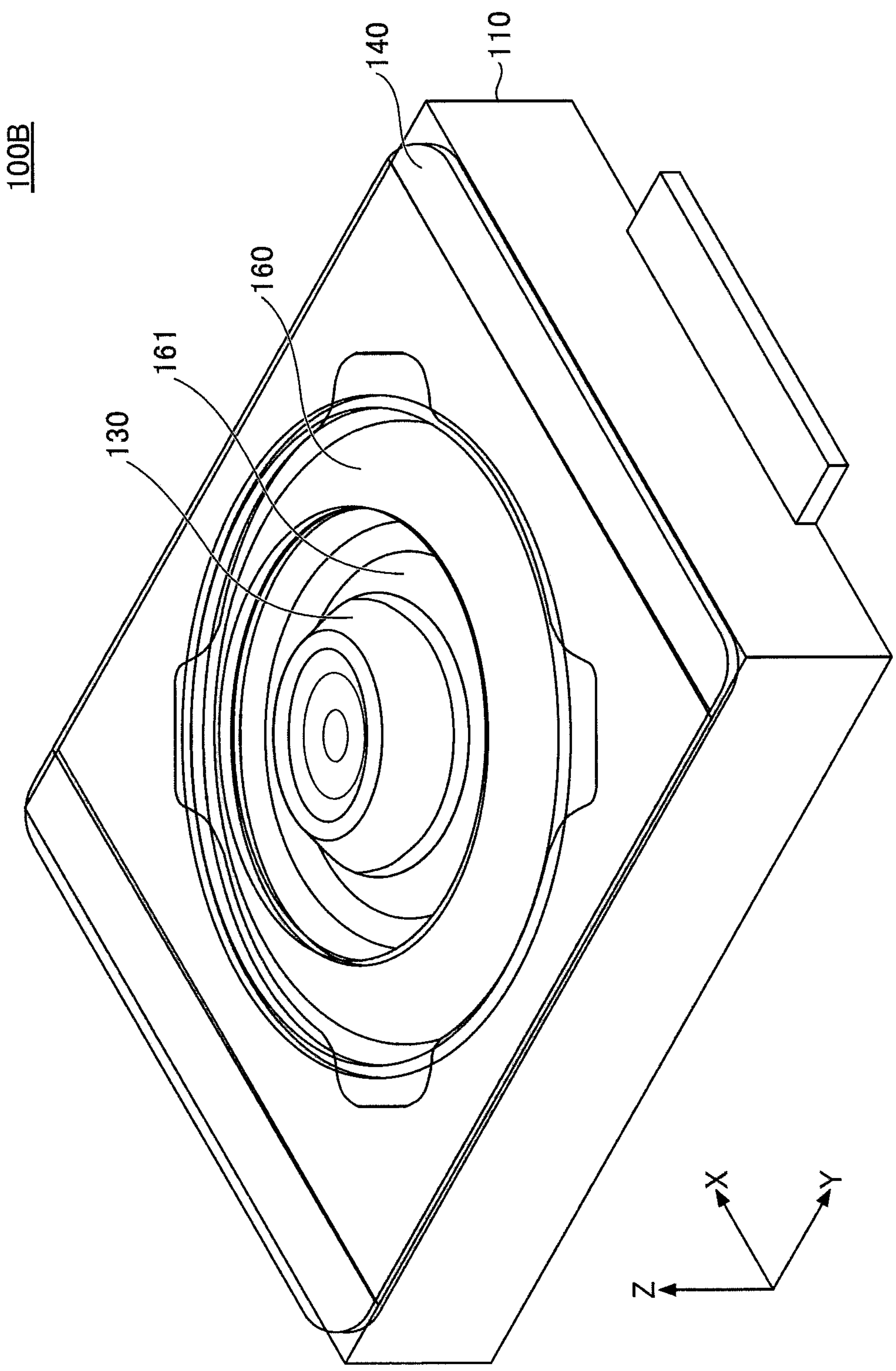
FIG. 10 is a perspective view of the push switch according to a second modification of the embodiment.
Figure 11:
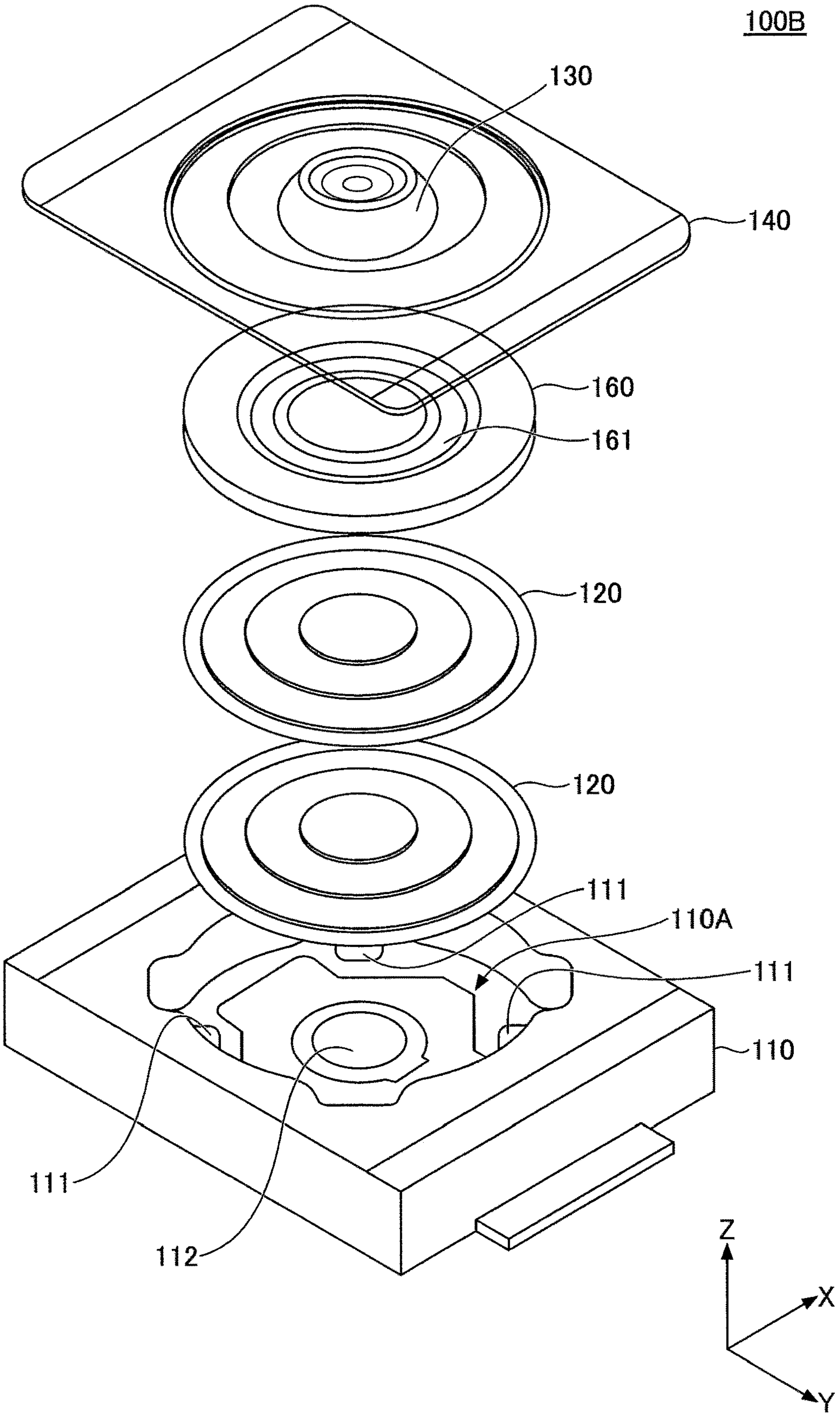
FIG. 11 is an exploded perspective view of the push switch according to the second modification.
Figure 12:
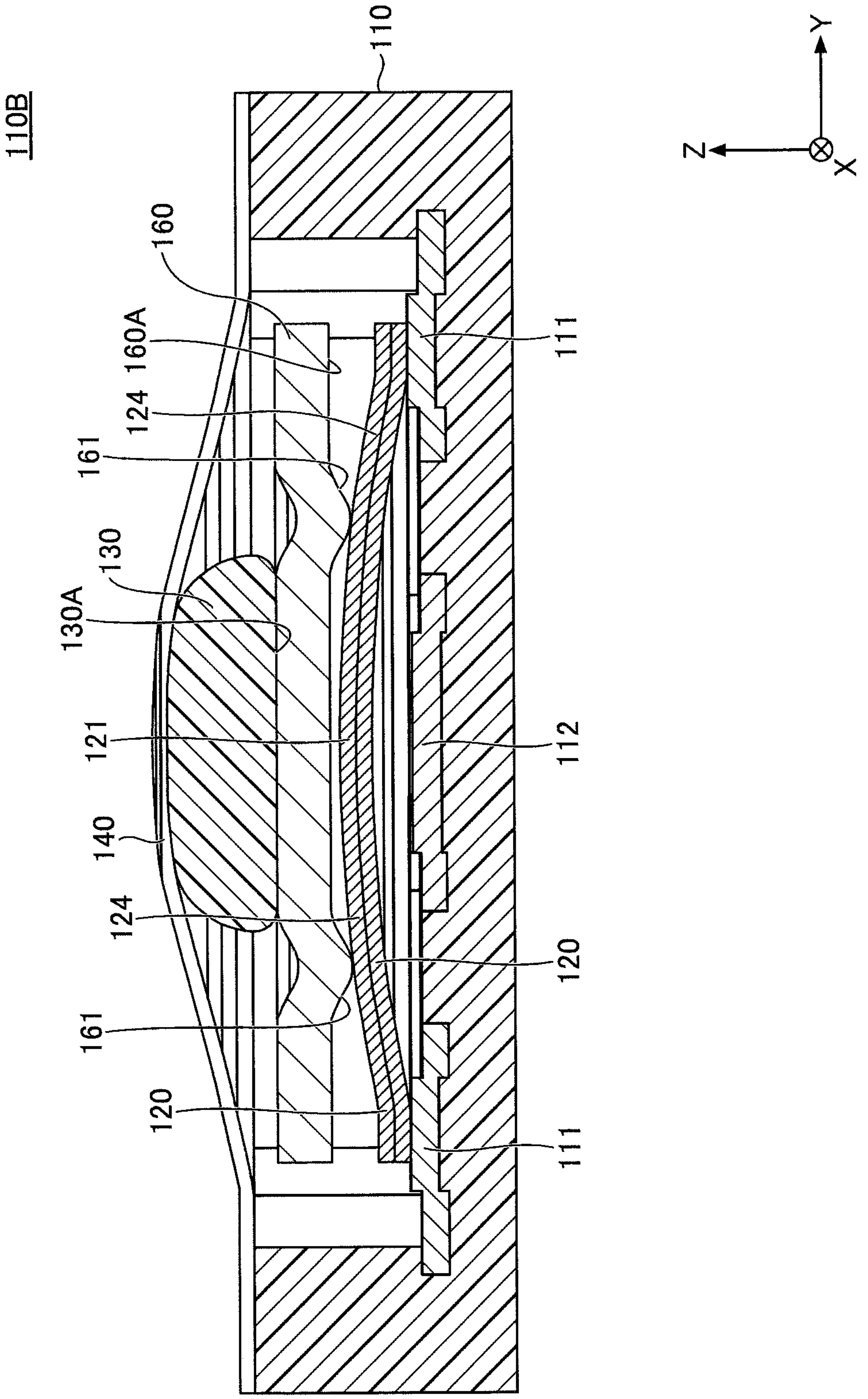
FIG. 12 is a cross-sectional view taken along the YZ plane of the push switch according to the second modification.

FIG. 10 is a perspective view of a push switch 100B of a second modification. FIG. 11 is an exploded perspective view of the push switch 100B of the second modification. FIG. 12 is a cross-sectional view taken along the YZ plane of the push switch 100B of the second modification.

The push switch 100B of the second modification does not have a pushing portion 131 on a bottom surface 130A of a pushing member 130. That is, the push switch 100B of the second modification has a flat surface on the bottom surface 130A of the pushing member 130.

The push switch 100B of the second modification has circular metal contacts 120 in a plan view. That is, in the push switch 100B of the second modification, the metal contacts 120 is not subjected to so-called side cutting. According to the push switch 100B of the second modification, a housing space 110A of a case 110 has a circular shape in a plan view.

The push switch 100B of the second modification is provided with a spacer 160 between the pushing member 130 and the metal contacts 120. The metal contacts 120 are formed of stainless steel and has a thickness of t=0.02 mm or more and t=0.05 mm or less. The spacer 160 is a horizontal disk-like member formed of a metal plate. The diameter of the spacer 160 is the same as the diameter of the metal contacts 120. The spacer 160 is placed on top of the metal contacts 120. However, the thickness of the spacer 160 is greater than the thickness of the metal contacts 120. Thus, the spacer 160 has a higher rigidity than the metal contacts 120. The spacer 160 may be formed of a material that is different from the material of the metal contacts 120, and that has a higher rigidity than the material of the metal contacts 120.

A bottom surface 160A of the spacer 160 is provided with an annular pushing portion 161 that protrudes downward (in the negative direction of the Z-axis). The pushing portion 161 is formed by press-working the spacer 160. The diameter of the pushing portion 161 is greater than the diameter of a central portion 121 of the metal contacts 120. Thus, the pushing portion 161 abuts a sloped portion 124 which is an outer portion of the central portion 121 of the metal contacts 120.

In the push switch 100B of the second modification, when the pushing member 130 is subjected to pushing pressure from an operator, the pushing portion 161 of the spacer 160 pushes the sloped portion 124 which is an outer portion of the central portion 121 of the metal contacts 120.

Accordingly, the push switch 100B of the second modification can be switched to the on-state by inverting the metal contacts 120 with a shorter stroke amount than that of the conventional push switch. Therefore, according to the push switch 100B of the second modification, the stroke amount of the pushing operation can be reduced without reducing the size of the metal contacts 120.

In particular, in the push switch 100B of the second modification, the movement of both the metal contacts 120 and the spacer 160 in the horizontal direction (X-axis direction and Y-axis direction) is regulated by the inner wall of the housing space 110A in the case 110. Therefore, the displacement of the spacer 160 with respect to the metal contacts 120 is not likely to occur. Accordingly, the push switch 100B of the second modification can push a predetermined position of the sloped portion 124 of the metal contacts 120 more reliably due to the annular pushing portion 161 formed in the spacer 160.

[Third Modification]

Figure 13:
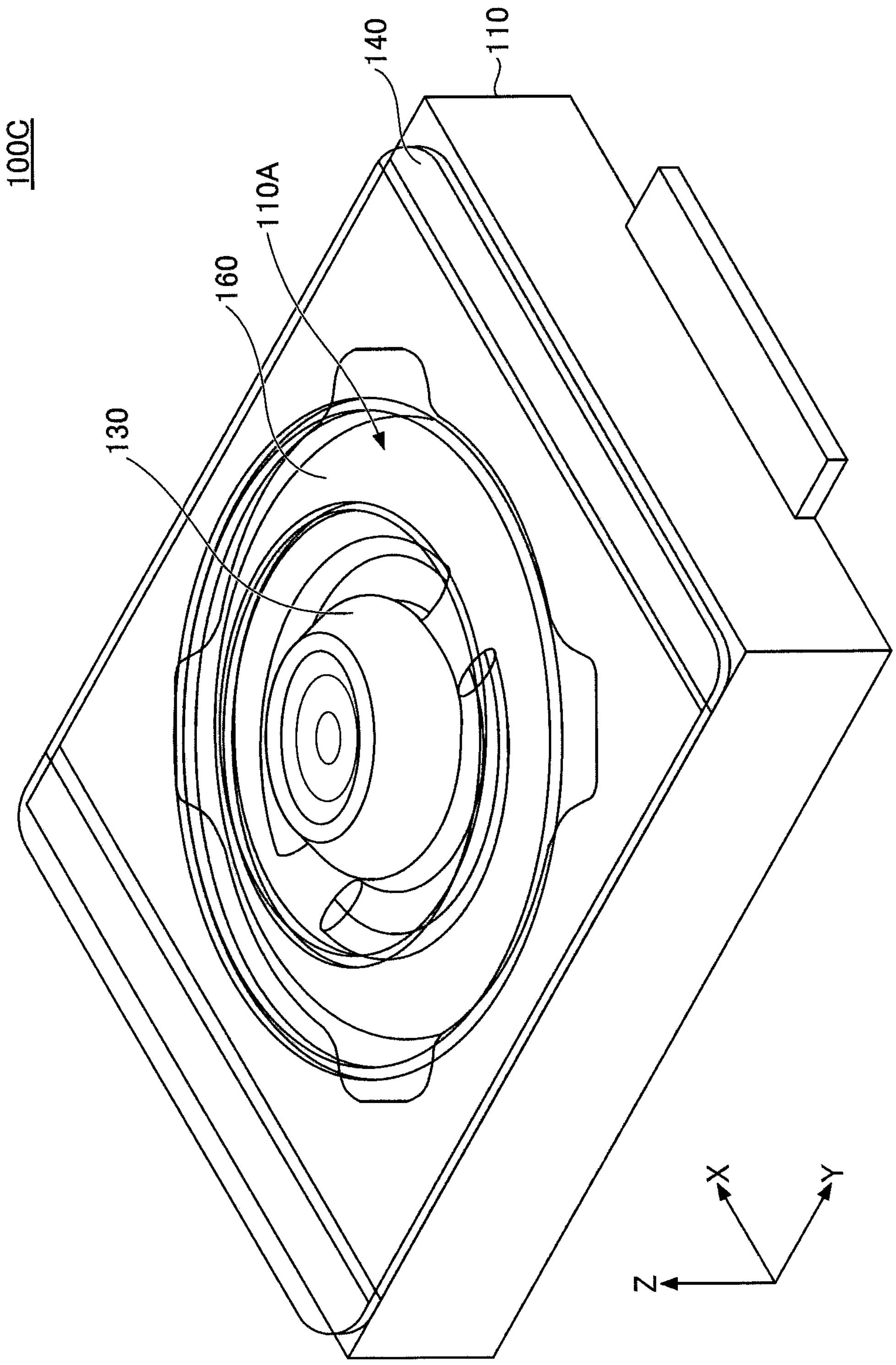
FIG. 13 is a perspective view of the push switch according to a third modification of the embodiment.
Figure 14:
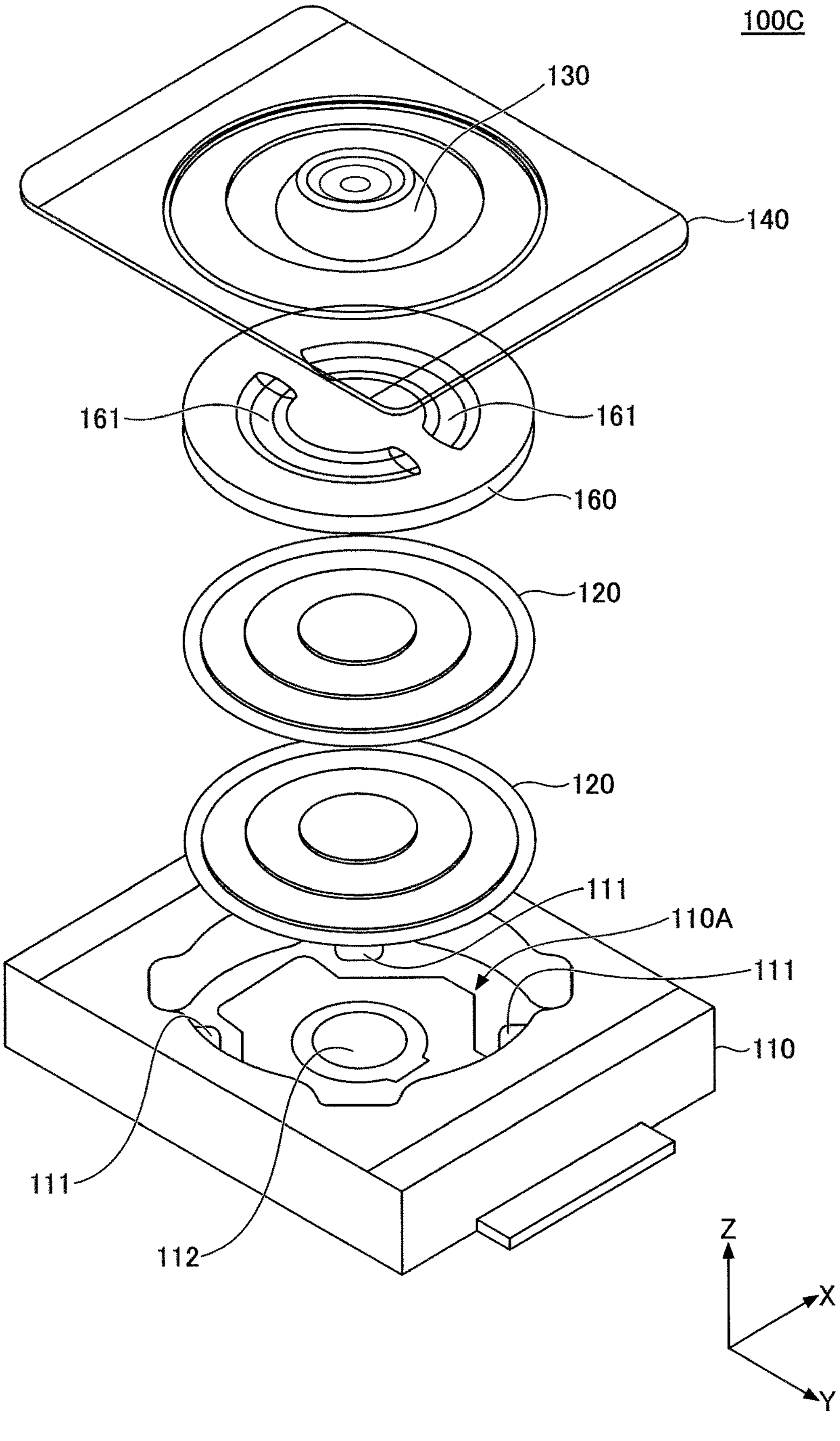
FIG. 14 is an exploded perspective view of the push switch according to the third modification.

FIG. 13 is a perspective view of a push switch 100C of a third modification. FIG. 14 is an exploded perspective view of the push switch 100C of the third modification.

Further, the push switch 100C of the third modification differs from the push switch 100B of the second modification in that a pushing portion 161 of a spacer 160 has a substantially annular shape in which a part of the annular shape is notched. That is, the push switch 100C of the third modification has the spacer 160 having two arc-like pushing portions 161.

In the push switch 100C of the third modification, when a pushing member 130 is subjected to pushing pressure from an operator, the pushing portion 161 of the spacer 160 pushes a sloped portion 124 of the metal contact, the sloped portion 124 being situated outside to the central portion 121 of the metal contacts 120.

Accordingly, the push switch 100C of the third modification can be switched to the on-state by inverting the metal contacts 120 with a shorter stroke amount than that of the conventional push switch. Therefore, according to the push switch 100C of the third modification, the stroke amount of the pushing operation can be reduced without reducing the size of the metal contacts 120.

[Fourth Modification]

Figure 15:
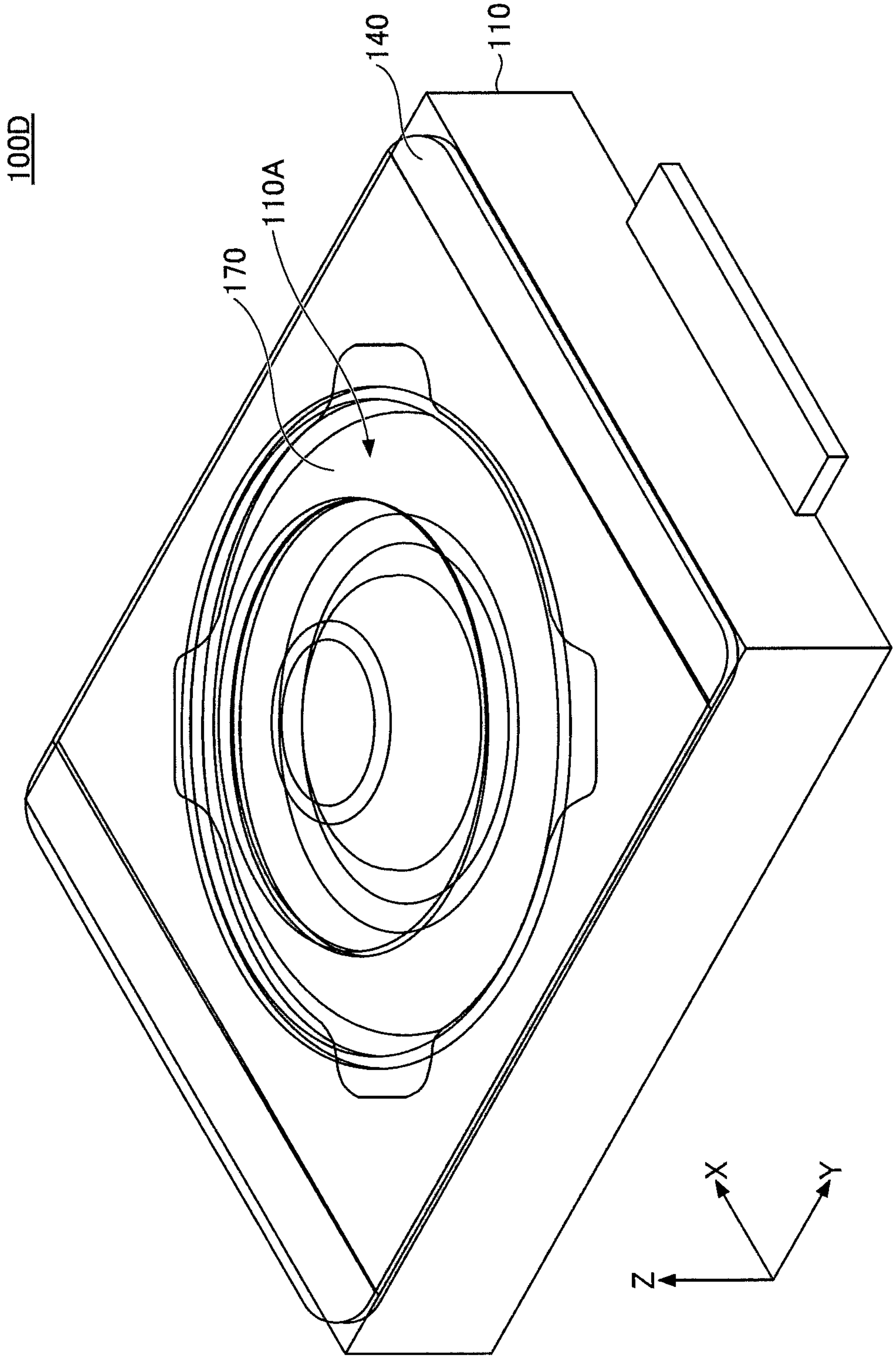
FIG. 15 is a perspective view of the push switch according to a fourth modification of the embodiment.
Figure 16:
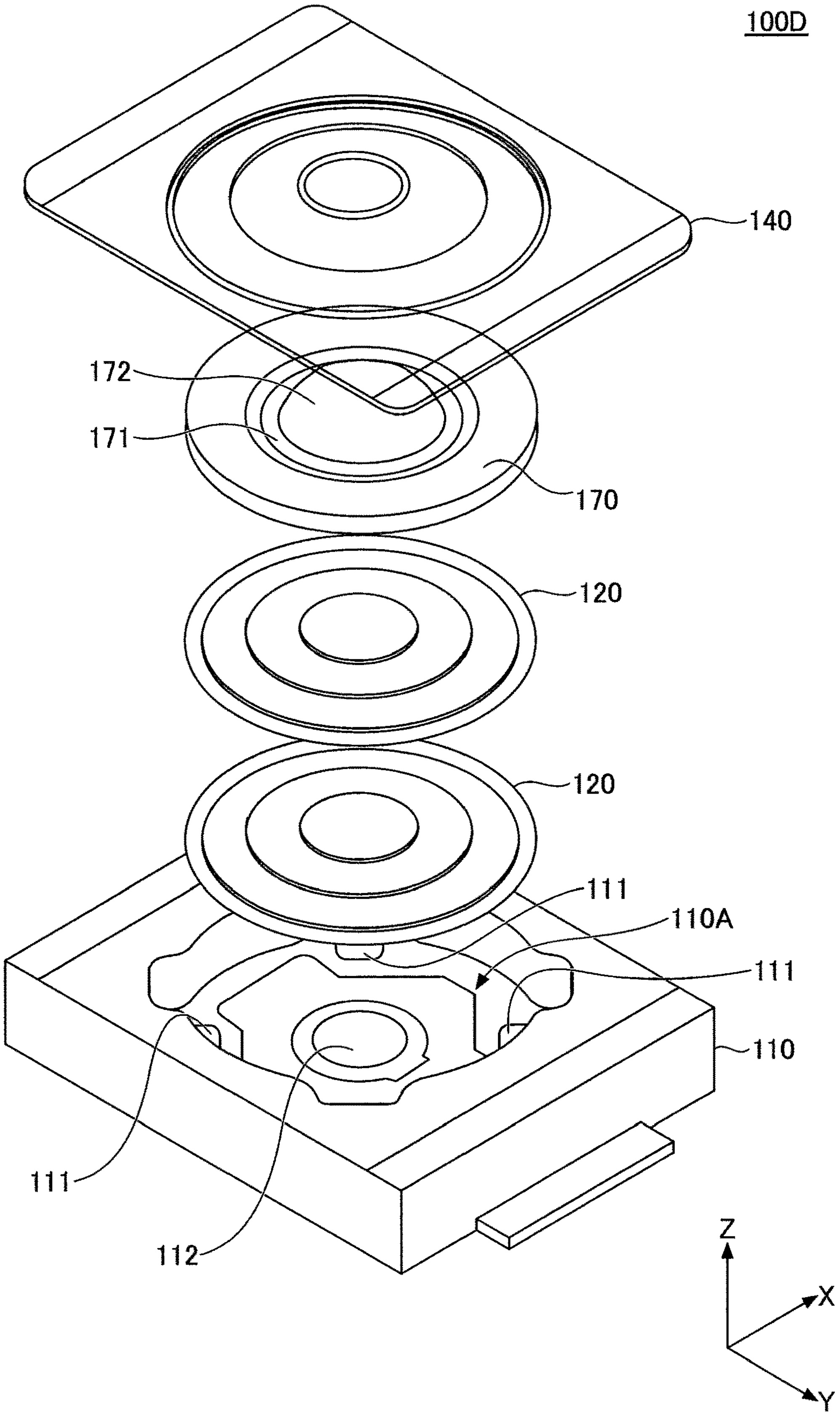
FIG. 16 is an exploded perspective view of the push switch according to the fourth modification.
Figure 17:
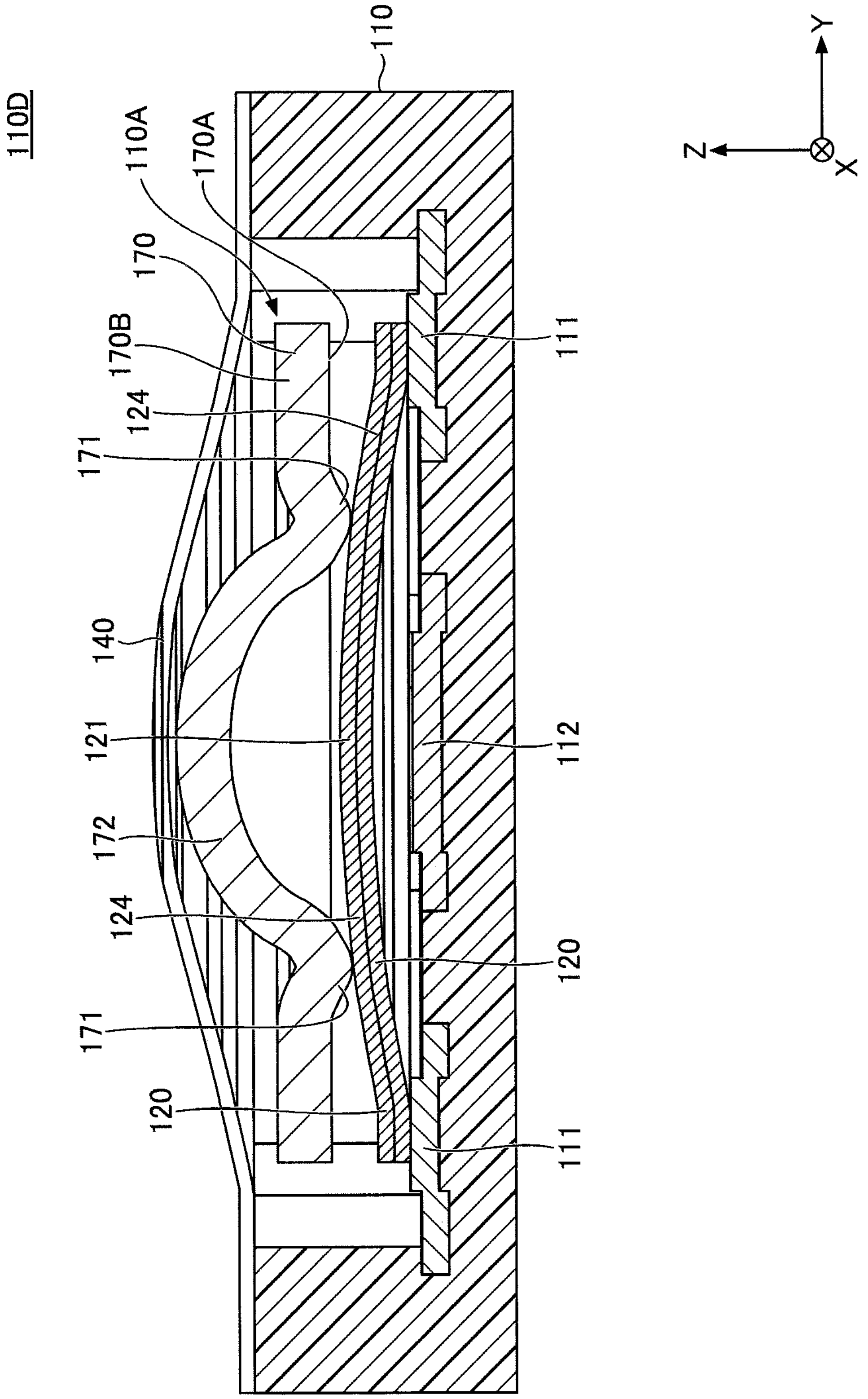
FIG. 17 is a cross-sectional view of the push switch taken along the YZ plane according to the fourth modification.

FIG. 15 is a perspective view of a push switch 100D of a fourth modification. FIG. 16 is an exploded perspective view of the push switch 100D of the fourth modification. FIG. 17 is a cross-sectional view taken along the YZ plane of the push switch 100D of the fourth modification.

The push switch 100D of the fourth modification includes a pushing member 170 instead of the pushing member 130. That is, the push switch 100D of the fourth modification is provided with a pushing member 170 between a cover sheet 140 and metal contacts 120. The pushing member 170 is a horizontal flat member formed of a metal plate.

The diameter of the pushing member 170 is the same as the diameter of the metal contacts 120. The pushing member 170 is placed on top of the metal contacts 120. However, the thickness of the pushing member 170 is greater than the thickness of the metal contacts 120. Thus, the pushing member 170 has a higher rigidity than the metal contacts 120. The pushing member 170 may be formed of a material different material from that of the metal contacts 120 and thus have a higher rigidity than the metal contacts 120.

A bottom surface 170A of the pushing member 170 is provided with an annular pushing portion 171 that protrudes downward (in the negative direction of the Z-axis). The diameter of the pushing portion 171 is greater than the diameter of a central portion 121 of the metal contacts 120. Thus, the pushing portion 171 abuts a sloped portion 124 which is an outer portion of the central portion 121 of the metal contacts 120.

Further, in a top surface 170B of the pushing member 170, a dome-shaped operating portion 172 that protrudes (in the Z-axis positive direction) is provided in the region surrounded by the pushing portion 171 (for example, the central portion of the pushing member 170). The operating portion 172 and the pushing portion 171 are integrally formed in the pushing member 170 by press-working the pushing member 170.

In the push switch 100D of the fourth modification, when the pushing member 170 is subjected to pushing pressure from an operator, the pushing portion 171 of the pushing member 170 pushes the sloped portion 124 which is an outer portion of the central portion 121 of the metal contacts 120.

Accordingly, the push switch 100D of the fourth modification can be switched to the on-state by inverting the metal contacts 120 with a shorter stroke amount than that of the conventional push switch. Therefore, according to the push switch 100D of the fourth modification, the stroke amount of the pushing operation can be reduced without reducing the size of the metal contacts 120.

In particular, the number of members in the push switch 100D of the fourth modification can be reduced compared to the case where the operating portion 172 and the pushing portion 171 are provided as separate portions, because the operating portion 172 and the pushing portion 171 in the push switch 100D of the fourth modification are integrally formed on the pushing member 170.

For example, a pushing portion is not limited to an annular shape. The pushing portion may be of any shape at least to push an outer portion of a movable contact portion than a central portion thereof. For example, the pushing portion may have a truncated shape (for example, substantially annular) of an annular portion.

For example, metal contacts 120 alternatively may not be side-cut (for example, circular shape which does not have a pair of linear edges in a plan view).

Further, the present invention is not limited to these embodiments, but various variations and modifications may be made without departing from the scope of the present invention.

What is claimed is:

1. A push switch comprising:

a case having a housing space with au upper opening;

fixed contacts provided at a bottom of the housing space in the case;

a movable contact member having a dome-shaped member, the movable contact member being disposed in the housing space, and having a central portion that is brought into contact with the fixed contacts by inverting the movable contact member in response to the movable contact member being pushed by an operator;

a pushing member is disposed above the movable contact member, the pushing member abuts a sloped portion of the movable contact member, and the pushing member is configured to push the sloped portion of the movable contact member upon being pushed by the operator, wherein the pushing member moves straight downward in a vertical direction to push the sloped portion being situated outside of the central portion of the movable contact member so that the movable contact member becomes inverted due to elastic deformation, wherein the fixed contacts include first fixed contacts and a second fixed contact, and the first fixed contacts are provided at respective ends in a lengthwise direction at the bottom of the housing space and the second fixed contact is provided in a center at the bottom of the housing space in the case, wherein the pushing member does not come in contact with the central portion of the movable contact member when bringing the central portion of the movable contact member into contact with the second fixed contact, wherein the pushing member has a pushing portion that protrudes downward toward a surface facing the movable contact member, and the pushing member pushes the sloped portion being situated outside of the central portion of the movable contact member through the pushing portion, wherein the movable contact member is the dome-shaped member formed of a thin metal plate with an upward convex shape in the vertical direction, wherein a stroke amount upon inverting the movable contact member near the central portion of the movable contact member is larger than an amount of movement of the sloped portion upon pushing down the movable contact member in the vertical direction, and wherein the sloped portion of the movable contact member abutted and pushed by the pushing member is situated outside of the central portion of the movable contact member and outside of the second fixed contact at the bottom of the case.

2. The push switch according to claim 1, wherein the pushing portion has an annular shape.

3. The push switch according to claim 1, wherein a diameter of the pushing member is smaller than a diameter of the movable contact member.

* * * * *